United States Patent [19]

Stumpf

[11] Patent Number: 5,579,177
[45] Date of Patent: Nov. 26, 1996

[54] OPTICAL DISPERSION APPARATUS AND METHOD

[75] Inventor: Kenneth D. Stumpf, Chelmsford, Mass.

[73] Assignee: Dolan-Jenner Industries, Inc., Lawrence, Mass.

[21] Appl. No.: 146,406

[22] Filed: Nov. 1, 1993

[51] Int. Cl.[6] .............................. G02B 5/04; G02B 27/12
[52] U.S. Cl. .......................... 359/837; 359/615; 359/639; 359/640
[58] Field of Search .................................. 359/639, 640, 359/615, 831, 837, 618

[56] References Cited

U.S. PATENT DOCUMENTS

| | | | |
|---|---|---|---|
| 4,597,634 | 7/1986 | Steenblik | 359/615 |
| 5,315,435 | 5/1994 | Horiuchi | 359/557 |
| 5,461,513 | 10/1995 | Maruyama | 359/837 |

FOREIGN PATENT DOCUMENTS

| | | | |
|---|---|---|---|
| 3-94214 | 4/1991 | Japan | 359/557 |
| 3-94215 | 4/1991 | Japan | 359/557 |

OTHER PUBLICATIONS

Koester, Charles J., "Wavelength Multiplexing in Fiber Optics," *J. Optical Society of America*, 38:63 (1968, Jan.).

Primary Examiner—Georgia Y. Epps
Assistant Examiner—Jacqueline M. Steady
Attorney, Agent, or Firm—Hamilton, Brook, Smith, & Reynolds, P.C.

[57] ABSTRACT

A planar parallel plate direct vision prism including two glasses for dispersing light as a function of color is disclosed. Also disclosed is an optical system which includes a first optical assembly having two planar parallel plate direct vision prisms for dispersing light as a function of color. The degree and orientation of the light dispersed is controlled by rotating the two prisms of the first assembly in relation to each other and together in unison. A fiber optic bundle transmits the dispersed light and a second optical assembly having two planar parallel plate direct vision prisms recombines the dispersed light emerging from the fiber optic bundle. The degree and orientation of the light recombined is controlled by rotating the prisms of the second optical assembly in relation to each other and together in unison.

24 Claims, 4 Drawing Sheets

OPTICAL DISPERSION APPARATUS AND METHOD

BACKGROUND OF THE INVENTION

The quality of images transmitted through fiber optic bundles is affected by broken or missing fibers in the bundle. One suggested method of improving the quality of transmitted images is to disperse the light from the image as a function of color over multiple fibers with a wedge-shaped prism at the input end of the fiber optic bundle. In this manner, an image point which would typically be transmitted by a single fiber is transmitted by multiple fibers. Therefore, a missing or broken fiber does not heavily affect the quality of the transmitted image. Another wedge-shaped prism recombines the dispersed light at the output end of the fiber optic bundle so that the image can be viewed.

SUMMARY OF THE INVENTION

A problem with the use of wedge-shaped prisms is that light entering a prism is on a different physical axis than the light dispersed by the prism. This optical elbow makes the optical alignment of the fiber optic bundle and the wedge-shaped prisms difficult. Additionally, the wedge-shaped prism arrangement provides no means for adjusting the degree of light dispersion or the directional orientation of the dispersed light about the optical axis in order to account for varying focal lengths and varied positions of components.

Accordingly, there is a need for an optical dispersion apparatus for dispersing light as a function of color in which the components are easily aligned and in which the degree of light dispersed, as well as the orientation of the dispersed light about the optical axis, can be controlled.

In one embodiment, the present invention provides a planar parallel plate prism for dispersing light as a function of color with the dispersed light having the same nominal optical axis as the light entering the prism. The planar parallel plate prism includes first and second prismatic elements, having planar interior and exterior surfaces. The interior surface of the first prismatic element contacts and is cemented to the interior surface of the second prismatic element. The exterior surfaces of the first and second prismatic elements are substantially parallel to each other and are perpendicular to the optical axis. The first prismatic element has an index of refraction at a nominal wavelength which is substantially the same as the index of refraction at the same nominal wavelength for the second prismatic element. However, the index of refraction of the first prismatic element for non-nominal wavelengths is different than the index of refraction of the second prismatic element for the same non-nominal wavelengths. Light is dispersed as a function of color by the planar parallel plate prism by passing the light through the first and second prismatic elements.

A preferred embodiment of the present invention provides an optical assembly having a first planar parallel plate direct vision prism on an optical axis for dispersing light as a function of color and a second planar parallel plate direct vision prism on the same optical axis for further dispersing light as a function of color. The first and second prisms are rotatable in relation to each other about the optical axis for controlling the degree of dispersion of light. The degree of dispersion can be controlled between zero dispersion and double the amount of dispersion produced by a single prism. The first and second prisms are also rotatable together in unison about the optical axis for controlling the orientation of the dispersed light about the optical axis.

The optical assembly can also recombine light that has been dispersed as a function of color by dispersing the light as a function of color with the first planar parallel plate direct vision prism to partially recombine the dispersed light. The partially recombined light is further dispersed by the second planar parallel plate direct vision prism to further recombine the light. The degree of dispersed light that is recombined is controlled by rotating the first and second prisms in relation to each other about the optical axis.

An additional preferred embodiment of the present invention provides an optical system having a first direct vision assembly for receiving and controllably dispersing light as a function of color along a first optical axis. A coherent optical fiber bundle conveys the dispersed light and a second direct vision assembly controllably recombines the dispersed light exiting the optical fiber bundle along a second optical axis. Each of the first and second direct vision assemblies includes at least one planar parallel plate direct vision prism.

BRIEF DESCRIPTION OF THE DRAWINGS

The foregoing and other objects, features and advantages of the invention will be apparent from the following more particular description of the preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1A:
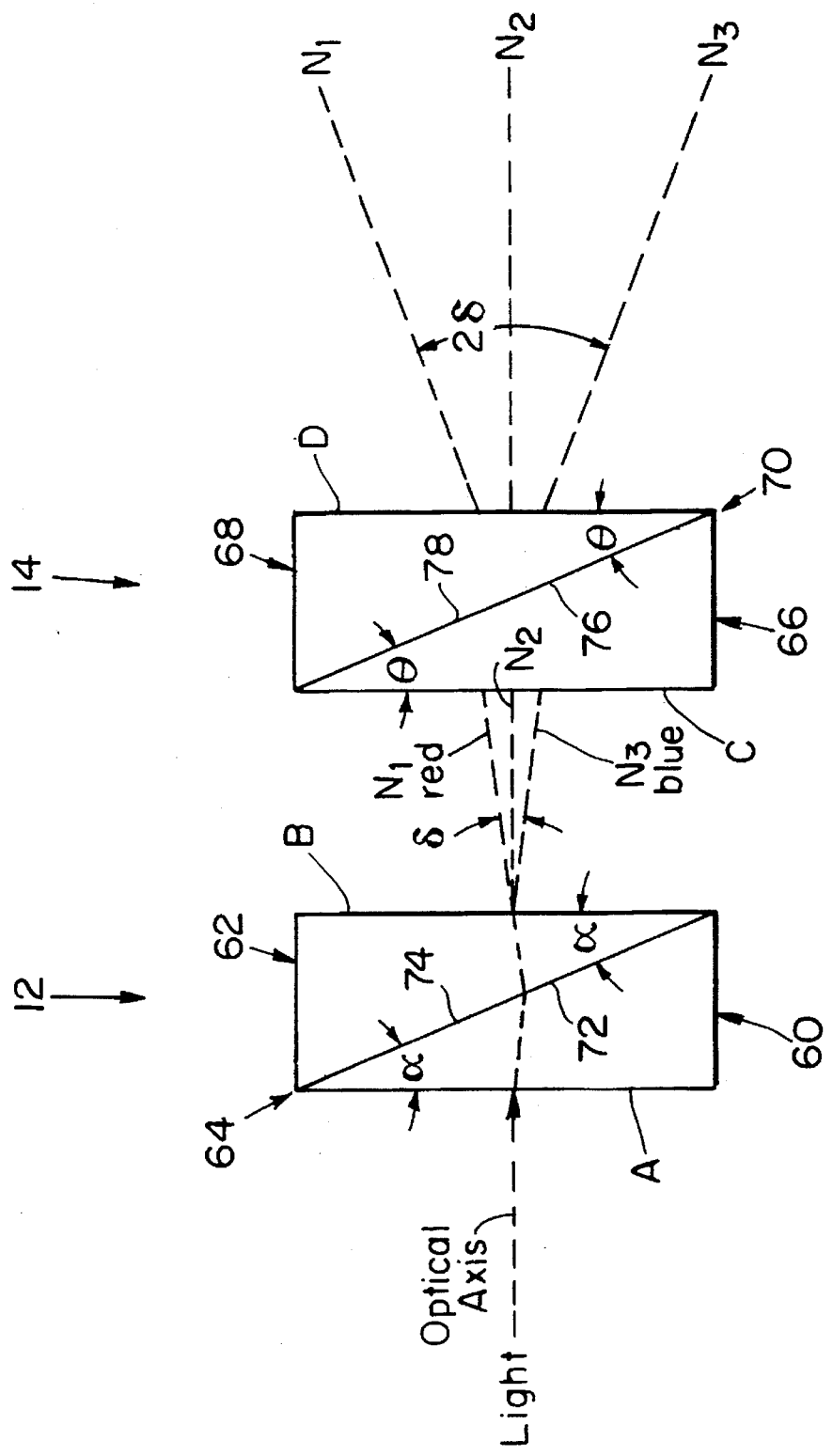
FIG. 1a is a schematic representation of the present invention dispersing light as a function of color through two plane parallel plate direct vision prisms.

In FIG. 1a, plane parallel plate direct vision prism 12 includes two optical glasses 60 and 62 with identical apex angles α and a circular diameter of, for example, 1 inch. A direct vision prism such as prism 12 disperses light as a function of color along the same physical axis as light entering the direct vision prism. The planar surfaces 72 and 74 of glasses 60 and 62 are cemented together along joint 64 to form a ½ inch thick plate. The diameter and thickness of prism 12 can be varied. Exterior surfaces A and B are parallel to each other and are perpendicular to the optical axis passing through surfaces A and B.

The index of refraction for glass 60 at a given nominal wavelength $N_2$ is substantially the same as the index of refraction for glass 62 at that same nominal wavelength. The optical behavior at this wavelength is identical to a plane parallel plate. Due to differing Abbe numbers for glasses 60 and 62, the indices of refraction of glasses 60 and 62 are different for non-nominal wavelengths. For example, in a preferred embodiment, glass 60 is made of SK-16 optical glass and glass 62 is made of F-2 optical glass. The indices of refraction for glasses 60 and 62 made of those materials are approximately matched at the sodium d line where glass 60 has an index of refraction of 1.62041 and glass 62 has an index of refraction of 1.62004. The dispersion for glass 60 is low with an Abbe number of 60.33 while the dispersion for glass 62 is high with an Abbe number of 36.37. Alternatively, the materials and dispersions for glasses 60 and 62 may be varied, but it is preferred that the difference between Abbe numbers for glasses 60 and 62 be maximized so that the dispersion of the prism is maximized. The Abbe number for a glass is defined as:

$$V = \frac{N_2 - 1}{(N_3 - N_1)}$$

where $N_1$=the index of refraction at the hydrogen c line (0.6563 microns)

$N_2$=the index of refraction at the sodium d line (0.5893 microns)

$N_3$=the index of refraction at the helium f line (0.4861 microns)

Light passing through prism 12 along the optical axis is dispersed as a function of color in a spectrum having an angle δ which is exaggerated for purposes of showing the dispersion because the actual dispersion angle δ is very small. Since the index of refraction of the two prism plates for the nominal wavelength $N_2$ is the same, light of wavelength $N_2$ remains along the optical axis with no refraction between the present elements. However, non-nominal wavelengths such as $N_1$ and $N_3$ are dispersed over the angle δ due to differing indices of refraction for glasses 60 and 62 for non-nominal wavelengths. A large difference in the Abbe numbers of glasses 60 and 62 creates a greater dispersion of light. Additionally, if prism 12 is made thicker, the angle δ of dispersion is also increased.

Prism 12 does not form an optical elbow such as those created by wedge-shaped prisms because light of the nominal wavelength $N_2$ dispersed by prism 12 remains along the same physical axis as light entering prism 12. This allows other optical components to be easily aligned on the same optical axis as prism 12 because the other optical components can be aligned on the same physical axis as prism 12. Additionally, the use of the plane parallel plate design of prism 12 reduces optical errors which can be found when using wedge-shaped prisms. Planar parallel plates reduce the amount of spherical aberration and astigmatism caused by converging optical beams in a prism.

The extent of light dispersed as a function of color can be controlled by adding a second plane parallel plate direct vision prism 14 identical to prism 12 along the optical axis. When prism 14 is in the same angular orientation as prism 12 (as depicted in FIG. 1a), prism 14 will further disperse the light dispersed by prism 12 and double the dispersion angle to 2δ.

Figure 1B:
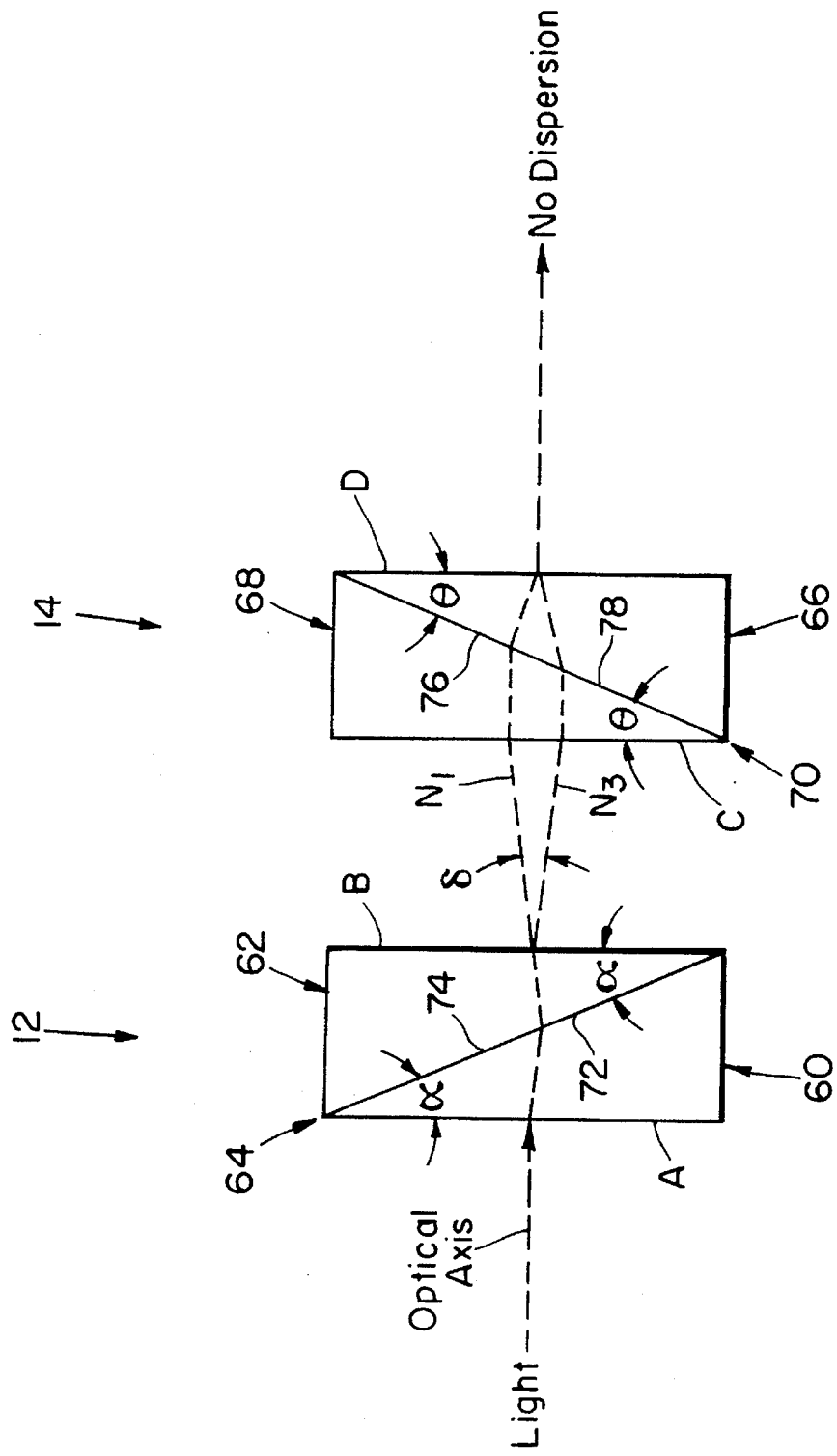
FIG. 1b is a schematic representation of the present invention dispersing light as a function of color with a first plane parallel plate direct vision prism and recombining the dispersed light with a second plane parallel plate direct vision prism.

In FIG. 1b, prism 14 is rotated 180 degrees from its original position (as depicted in FIG. 1a). In this rotated position, light dispersed as a function of color by prism 12 is dispersed in the opposite direction by prism 14 to recombine the dispersed light along the optical axis. The result is a zero dispersion of light.

By controlling the relative rotation between identical prisms 12 and 14 within 0° and 180° (as depicted in FIGS. 1a and 1b), the amount of light dispersion can be controlled between double the dispersion of prism 12 and zero dispersion.

Figure 2:
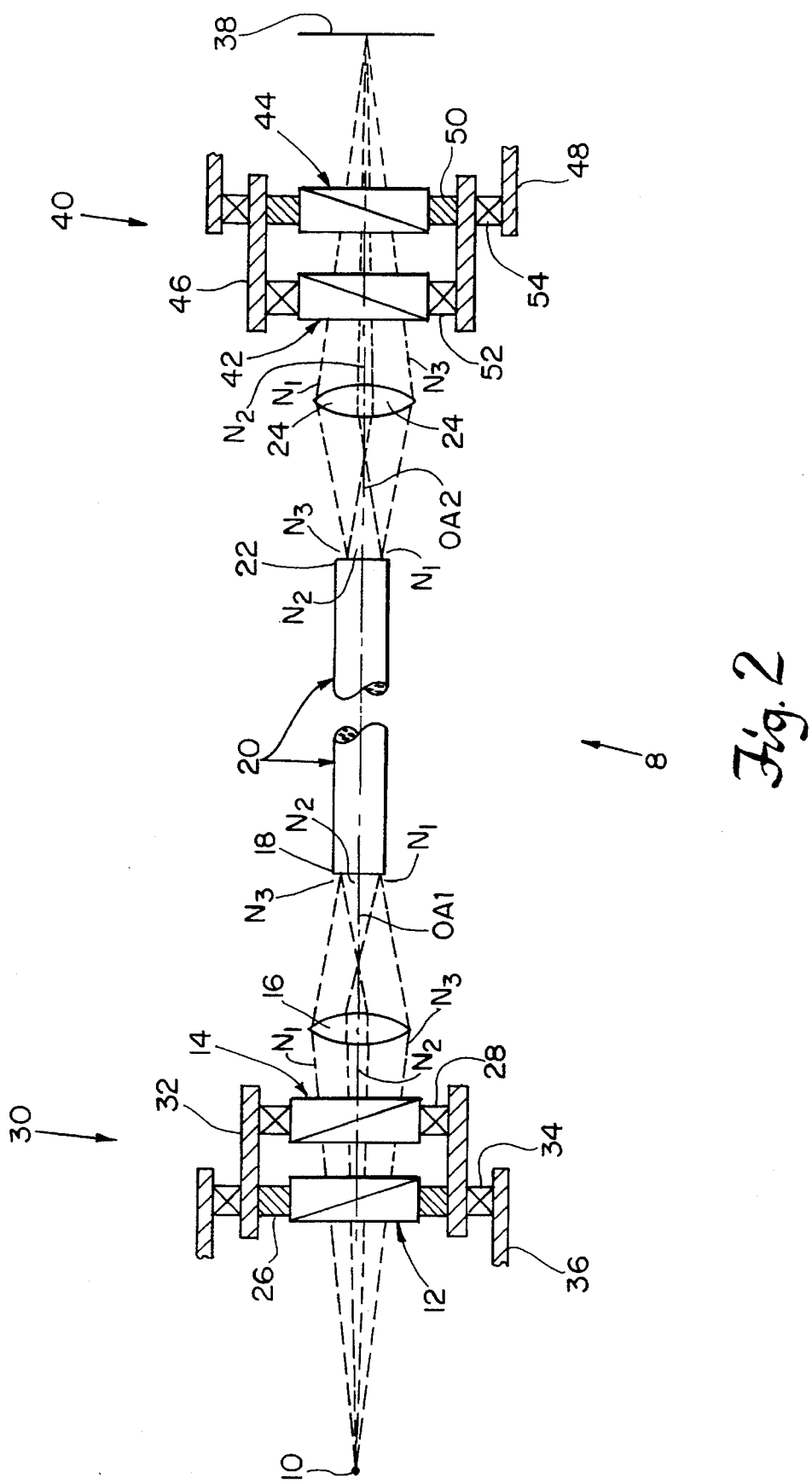
FIG. 2 is a schematic representation of the present invention optical dispersion apparatus.

In FIG. 2, coherent fiber optic bundle 20 of optical system 8 has an optical assembly 30 positioned in proximity to the input end 18 of fiber optic bundle 20 along the optical axis 0A1. Optical assembly 40 is positioned in proximity to the output end 22 along the optical axis 0A2. Optical axis 0A1 is shown as being on the same physical and optical axis as optical axis 0A2. However, although optical axis 0A1 and 0A2 are always on the same optical axis, optical axis 0A1 and 0A2 are generally not on the same physical axis.

Optical assembly 30 has two identical plane parallel plate direct vision prisms 12 and 14 positioned along optical axis 0A1 for dispersing light as a function of color. Prisms 12 and 14 are previously described and depicted in FIGS. 1a and 1b. Converging lens 16 focuses light dispersed by prisms 12 and 14 onto the input end 18 of fiber optic bundle 20.

A spacer 26 secures prism 12 within an inner housing 32. Prism bearing 28 positions prism 14 within inner housing 32 and allows prism 14 to rotate about the optical axis. Housing bearing 34 allows inner housing 32 to rotate within outer housing 36. In this manner prism 14 can rotate relative to prism 12 about the optical axis and prisms 12 and 14 can rotate in unison together about the optical axis. Alternatively, spacer 26 can be replaced with a bearing for allowing prism 12 to rotate relative to prism 14 or together in unison with prism 14 about the optical axis.

Fiber optic bundle 20 is a coherent bundle of optical fibers for receiving light signals dispersed by optical assembly 30 and transmitting the signals to optical assembly 40. Input end 18 of fiber optic bundle 20 is on the same optical and physical axis as prism 12, prism 14 and converging lens 16 of optical assembly 30, allowing those components to be easily aligned.

Optical assembly 40 has identical components to optical assembly 30 but differs in that optical assembly 40 is in a reversed orientation to that of optical assembly 30. Optical assembly 40 is in proximity to output end 22 for recombining the dispersed light transmitted by fiber optic bundle 20. Additionally, optical assembly 40 is positioned so that converging lens 24 focuses light transmitted by fiber optic bundle 20 through prisms 42 and 44 onto surface 38 where the recombined images are viewed. For example, a CCD array may be positioned at surface 38. Prism 42, prism 44, converging lens 24 and viewing surface 38 of optical assembly 40 are on the same optical and physical axis as input end 22 of fiber optic bundle 20, allowing those components to be easily aligned.

In the operation of optical system 8, light from object 10 is dispersed as a function of color by prism 12 along optical axis 0A1 in the manner depicted in FIG. 1a. The dispersed light is further dispersed by prism 14 which is identical to prism 12. Nominal wavelength $N_2$ remains along optical axis 0A1 while non-nominal wavelengths $N_1$ and $N_3$ are dispersed at an angle from axis 0A1. Prism 14 is rotatable about the optical axis 0A1 and controls the degree of light dispersed by optical assembly 30 between double the dispersion of prism 12 to zero dispersion. The dispersed light is inverted and focused by converging lens 16 onto the input end 18 of fiber optic bundle 20. The orientation of dispersion of the light image focused upon input end 18 can be changed by rotating prisms 12 and 14 together in unison about the optical axis 0A1 by rotating inner housing 32 within outer housing 36.

The light dispersed by optical assembly 30 is transmitted through fiber optic bundle 20 in a manner where multiple optical fibers collectively transmit a single dispersed image which normally would be transmitted only by a single fiber optic if the light was not dispersed. Therefore, image quality problems caused by missing or broken fiber optics are minimized when an image is dispersed as a function of color over multiple fibers because a smaller portion of information for a given object point is lost. Instead, a small amount of information from each of a range of object points is lost.

The dispersed light emerging from the output end 22 of fiber optic bundle 20 along optical axis OA2 is recombined by optical assembly 40 in a manner similar to that depicted in FIG. 1b. The dispersed light is re-inverted and focused by converging lens 24 onto surface 38 through prisms 42 and 44. Prism 42 partially recombines the dispersed light to an intermediate degree. The partially recombined light is fully recombined by prism 44 and is viewed on surface 38. The extent of light recombined by assembly 40 can be controlled by rotating prism 42 in relation to prism 44 about the optical axis OA2 to account for varying focal lengths. Additionally, the orientation of the image viewed upon surface 38 can be controlled by rotating prisms 42 and 44 together in unison about the optical axis OA2 by rotating inner housing 46 within outer housing 48.

In an alternative embodiment, prisms 12, 14, 42 and 44 of optical system 8 do not have to be identical. In another alternative embodiment, optical assembly 30 can consist only of a single planar parallel plate direct vision prism 14 and converging lens 16. This single prism 14 can be fixed or can rotate to orientate the dispersed light. Additionally, optical assembly 40 can also consist only of a single prism 42 and converging lens 24 for recombining the dispersed light transmitted by fiber optic bundle 20.

Figure 3:
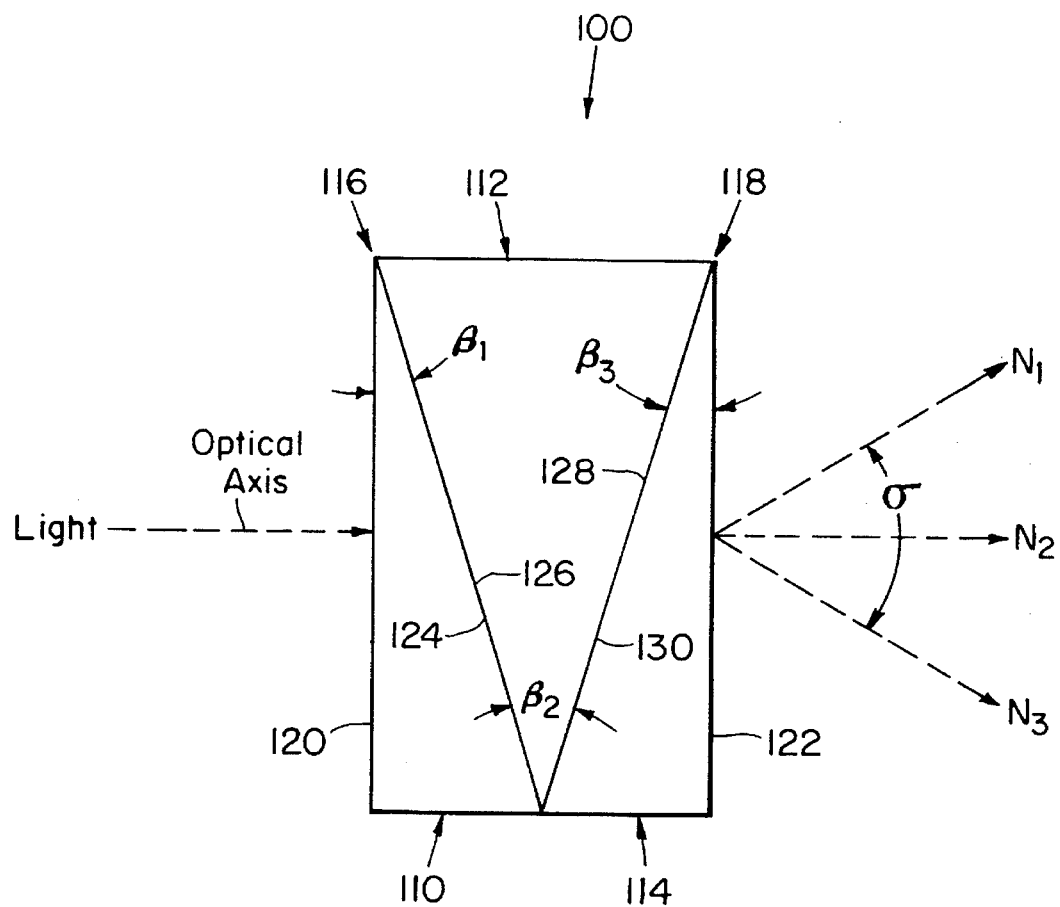
FIG. 3 is a schematic representation of a plane parallel plate having three prismatic elements.

Another preferred embodiment of the present invention is depicted in FIG. 3 in which planar parallel plate direct vision prism 100 has three glasses 110, 112 and 114 instead of two glasses as shown in FIGS. 1a and 1b. Alternatively, prism 100 can have more than three glasses. Surface 124 of glass 110 is cemented to surface 126 of glass 12 along joint 116. Surface 130 of glass 114 and surface 128 of glass 112 is cemented together along joint 118. Faces 120 and 122 are parallel to each other and are perpendicular to the optical axis. The size of apex angles $\beta_1$, $\beta_2$ and $\beta_3$ of glasses 110, 112 and 114 respectively, are dependent upon the width and diameter of prism 100 as well as the width of the individual glasses. Apex angles $\beta_1$, $\beta_2$ and $\beta_3$ do not have to be the same.

The indices of refraction for glasses 110, 112 and 114 are substantially the same for a nominal wavelength $N_2$. However, the indices of refraction for non-nominal wavelengths such as $N_1$ and $N_3$ are different for glasses 110, 112 and 114. As a result the Abbe numbers for glasses 110, 112 and 114 are different than each other but each remains in the range between 30 and 60. Light directed through prism 100 along the optical axis is dispersed as a function of color at an angle $\sigma$ along the optical axis.

In an alternative embodiment, planar parallel plate direct vision prism 100 can replace prisms 12, 14, 42 and 44 of optical system 8 depicted in FIG. 2. In addition, nonparallel plate direct vision prisms can also replace those prisms.

Equivalents

While this invention has been particularly shown and described with references to preferred embodiments thereof, it will be understood by those skilled in the art that various changes and form and details may be made therein without departing from the spirit and scope of the invention as defined by the dependent claims.

I claim:
1. An optical assembly comprising:
a first planar parallel plate prism comprising:

a first prismatic element having planar interior and exterior surfaces; and
a second prismatic element having planar interior and exterior surfaces, the interior surface of the first prismatic element contacting and attaching to the interior surface of the second prismatic element, the exterior surface of the first prismatic element being substantially parallel to the exterior surface of the second prismatic element; a second planar parallel plate prism comprising:
a first prismatic element having planar interior and exterior surfaces; and
a second prismatic element having planar interior and exterior surfaces, the interior surface of the first prismatic element contacting and attaching to the interior surface of the second prismatic element, the exterior surface of the first prismatic element being substantially parallel to the exterior surface of the second prismatic element;
a first housing for mounting the first and second prisms along an optical axis;
a first bearing mounted to the first housing and one of the prisms for rotationally isolating the first and second prisms from each other such that the first and second prisms are rotatable relative to each other about the optical axis;
a second housing for supporting the first housing; and
a second bearing mounted to the first and second housings for rotationally isolating the first housing from the second housing about the optical axis such that the first and second prisms are rotatable together in unison about the optical axis with rotation of the first housing.

2. The planar parallel plate prism of claim 1, in which the first and second prismatic elements have an index of refraction at a nominal wavelength which is substantially similar to each other.

3. The planar parallel plate prism of claim 2 in which each prismatic element has an Abbe number ranging between 30 and 60.

4. The planar parallel plate prism of claim 3 in which the first prismatic elements have a different Abbe number than the second prismatic elements.

5. An optical assembly comprising:
a first planar parallel plate direct vision prism having parallel front and rear faces on an optical axis for dispersing light as a function of color; and
a second planar parallel plate direct vision prism having parallel front and rear faces spaced apart from the first prism on the optical axis for further dispersing light received from the first prism; and
a first housing for mounting the first and second prisms along the optical axis;
a first bearing mounted to the first housing and one of the prisms for rotationally isolating the first and second prisms from each other such that the first and second prisms are rotatable relative to each other about the optical axis;
a second housing supporting the first housing; and
a second bearing mounted to the first and second housings for rotationally isolating the first housing from the second housing about the optical axis such that the first and second prisms are rotatable together in unison about the optical axis with rotation of the first housing.

6. The optical assembly of claim 5, further comprising a converging lens spaced apart from the first and second direct vision prisms along the optical axis.

7. The optical assembly of claim 5 in which the first and second planar parallel plate direct vision prisms comprise:
   a first prismatic element having planar interior and exterior surfaces;
   a second prismatic element having planar interior and exterior surfaces, the interior surface of the first prismatic element contacting and attaching to the interior surface of the second prismatic element, the exterior surface of the first prismatic element being substantially parallel to the exterior surface of the second prismatic element.

8. The optical assembly of claim 7, in which the first and second prismatic elements have an index of refraction at a nominal wavelength which is substantially similar to each other.

9. The optical assembly of claim 8 in which each prismatic element has an Abbe number ranging between 30 and 60.

10. The optical assembly of claim 9 in which the first prismatic element has a different Abbe number than the second prismatic element.

11. The optical assembly of claim 5 in which the first and second plane direct vision prisms comprise a plurality of prismatic elements having planar surfaces contacting each other such that two of the prismatic elements form planar ends being parallel to each other, the planar ends being on the optical axis.

12. The optical assembly of claim 11 in which the prismatic elements have a nominal index of refraction which is substantially similar to each other.

13. An optical assembly comprising:
   a first direct vision prism on an optical axis for dispersing light as a function of color; and
   a second direct vision prism on the optical axis for further dispersing light as a function of color;
   a first housing for mounting the first and second prisms along the optical axis;
   a first bearing mounted to the first housing and one of the prisms for rotationally isolating the first and second prisms from each other such that the first and second prisms are rotatable independent of each other about the optical axis;
   a second housing for supporting the first housing; and
   a second bearing mounted to the first and second housings for rotationally isolating the first housing from the second housing about the optical axis such that the first and second prisms are rotatable together in unison about the optical axis with rotation of the first housing.

14. The optical assembly of claim 13 in which the first and second direct vision prisms are planar parallel plate prisms comprising:
   a first prismatic element having planar interior and exterior surfaces; and
   a second prismatic element having planar interior and exterior surfaces, the interior surface of the first prismatic element contacting and attaching to the interior surface of the second prismatic element, the exterior surface of the first prismatic element being substantially parallel to the exterior surface of the second prismatic element.

15. The optical assembly of claim 14, in which the first and second prismatic elements have an index of refraction at a nominal wavelength which is substantially similar to each other.

16. The optical assembly of claim 15 in which each prismatic element has an Abbe number ranging between 30 and 60.

17. The optical assembly of claim 16 in which the first prismatic element has a different Abbe number than the second prismatic element.

18. The optical assembly of claim 13 further comprising a converging lens spaced apart from the first and second prisms on the optical axis.

19. A method for dispersing light comprising:
   dispersing light as a function of color through a first plane parallel plate direct vision prism;
   further dispersing said light as a function of color through a second plane parallel plate direct vision prism, the first and second prisms being mounted within a first housing along an optical axis, a first bearing being mounted to the first housing and one of the prisms for rotationally isolating the first and second prisms from each other such that the first and second prisms are rotatable independently of each other about the optical axis;
   controlling the degree of dispersion by rotating the first and second prisms relative to each other about the optical axis; and
   controlling the orientation of the dispersed light by controllably rotating the first housing to rotate the first and second prisms together in unison about the optical axis, a second housing supporting the first housing, a second bearing mounted to the first and second housings for rotationally isolating the first housing from the second housing about the optical axis such that the first and second prisms are rotatable together in unison about the optical axis with rotation of the first housing.

20. The method of claim 19 further comprising focusing the dispersed light with a converging lens.

21. A method for dispersing light comprising:
   passing light through a first prismatic element of a first planar parallel plate direct vision prism;
   passing said light through a second prismatic element of said first prism, the second prismatic element contacting and attached to the first prismatic element;
   passing said light through a first prismatic element of a second planar parallel plate direct vision prism;
   passing said light through a second prismatic element of said second prism, the second prismatic element contacting and attached to the first prismatic element;
   mounting the first and second prisms to a first housing along an optical axis, a first bearing being mounted to the first housing and one of the prisms for rotationally isolating the first and second prisms from each other about the optical axis such that the first and second prisms are rotatable relative to each other about the optical axis;
   controlling the degree of dispersion by rotating the first and second prisms relative to each other about the optical axis; and
   controlling the orientation of the dispersed light by controllably rotating the first and second prisms together in unison about the optical axis, a second housing supporting the first housing, a second bearing being mounted to the first and second housings for rotationally isolating the first housing from the second housing about the optical axis such that the first and second prisms are rotatable together in unison about the optical axis with rotation of the first housing.

22. A method for recombining dispersed light comprising:
   receiving light dispersed as a function of color and dispersing said light as a function of color with a first plane parallel plate direct vision prism on an optical axis to recombine the dispersed light;

further dispersing said light again as a function of color with a second plane parallel plate direct vision prism on the optical axis to further recombine the dispersed light;

controlling the degree of recombining dispersed light by rotating the first and second prisms in relation to each other about the optical axis, the first and second prisms being mounted to a first housing along the optical axis, a first bearing being mounted to the first housing and one of the prisms for rotationally isolating the first and second prisms from each other such that the first and second prisms are rotatable independently of each other about the optical axis; and controlling the orientation of the recombined light by controllably rotating the first and second prisms together in unison about the optical axis, a second housing supporting the first housing, a second bearing being mounted to the first and second housings for rotationally isolating the first housing from the second housing about the optical axis such that the first and second prisms are rotatable together in unison about the optical axis with rotation of the first housing.

23. The method of claim 22 further comprising focusing the dispersed light onto the first plane parallel plate direct vision prism with a converging lens.

24. A method for recombining dispersed light comprising:

passing light dispersed as a function of color through a first prismatic element of a first planar parallel plate direct vision prism;

passing said light through a second prismatic element of said first prism, the second prismatic element contacting and attached to the first prismatic element;

passing said light through a first prismatic element of a second planar parallel plate direct vision prism;

passing said light through a second prismatic element of said second prism, the second prismatic element contacting and attached to the first prismatic element;

mounting the first and second prisms to a first housing along an optical axis, a first bearing being mounted to the first housing and one of the prisms for rotationally isolating the first and second prisms from each other along the optical axis such that the first and second prisms are rotatable relative to each other about the optical axis;

controlling the degree of recombined dispersed light by rotating the first and second prisms relative to each other about the optical axis; and controlling the orientation of the recombined light by controllably rotating the first and second prisms together in unison about the optical axis, a second housing supporting the first housing, a second bearing being mounted to the first and second housings for rotationally isolating the first housing from the second housing about the optical axis such that the first and second prisms are rotatable together in unison about the optical axis with rotation of the first housing.

* * * * *